M. GOHLKE.
BALL BEARING CAGE.
APPLICATION FILED NOV. 3, 1911.
1,151,581.
Patented Aug. 31, 1915.
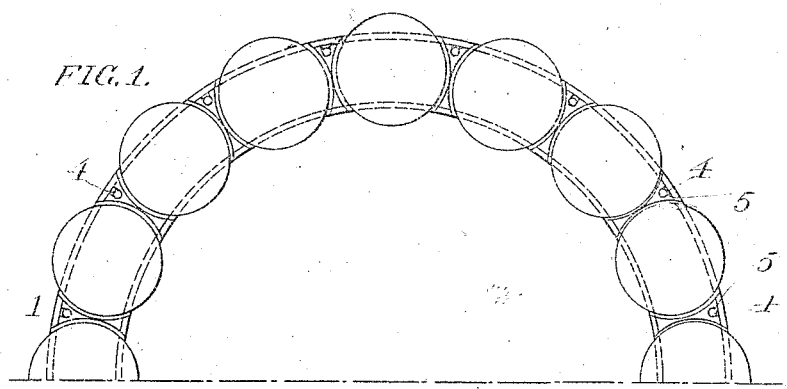
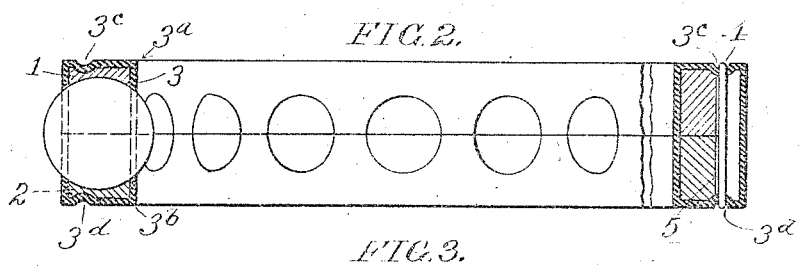
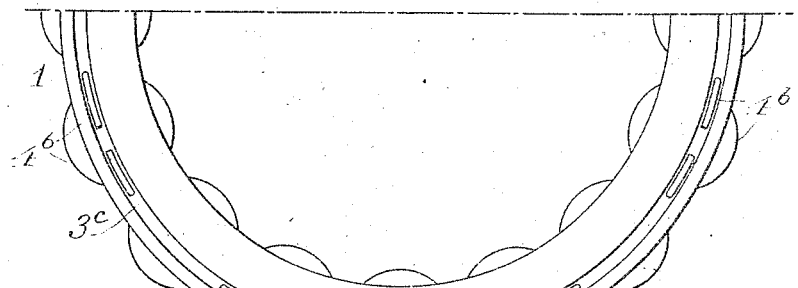
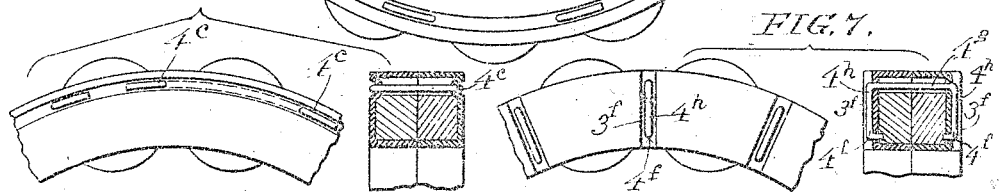
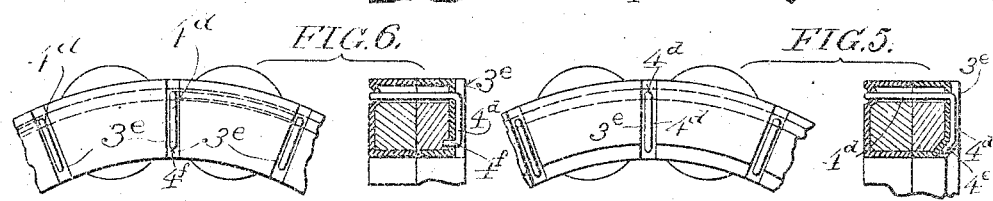
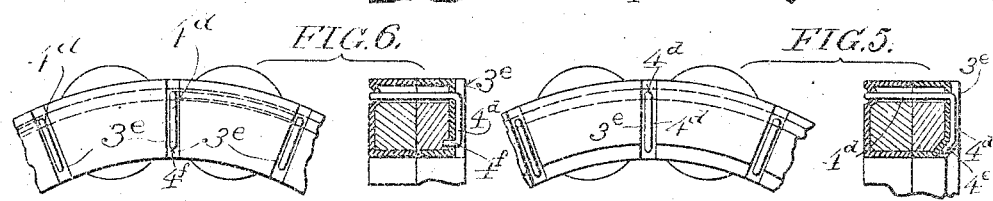

UNITED STATES PATENT OFFICE.

MAX GOHLKE, OF BERLIN, GERMANY.

BALL-BEARING CAGE.

1,151,581.

Specification of Letters Patent.

Patented Aug. 31, 1915.

Application filed November 3, 1911. Serial No. 658,335.

*To all whom it may concern:*

Be it known that I, MAX GOHLKE, a subject of the Emperor of Germany, residing at Berlin, Germany, have invented certain new and useful Improvements in Ball-Bearing Cages, of which the following is a specification, reference being had therein to the accompanying drawing.

This invention relates to separators or cages for anti-friction bearings, for maintaining the rolling elements in spaced relations, and the invention has reference more particularly to that type of cage comprising opposing sections, commonly in the form of rings, which are provided in their adjacent faces with recesses constituting conjointly holding sockets for the rolling elements, the said rings being connected together by suitable fastening devices.

The object of the present invention is to so fasten the parts of the cage together that they will be securely and firmly united, while at the same time admitting of the employment of the greatest number of rolling elements.

A full complement of rolling elements necessitates that they be arranged very close together in the cage with their surfaces just out of contact. When thus arranged, the portions of the cage between the rolling elements are very limited and not of such extent or width to admit of the employment of fastening devices of sufficient size between the rolling elements to properly and securely hold the parts of the cage together.

In order to admit of the full equipment of rolling elements in the cage and at the same time fasten the parts of the cage firmly and securely together, I propose in accordance with my invention to apply to the parts of the cage, a casing or sheath which will have an extended contact with the cage sections, and I propose to employ fastening devices for clamping the casing to the cage sections. As a result of this construction, the fastening devices may be of such a size and form which will admit of their use between the closely assembled rolling elements, but which will on account of the external casing, act to hold the parts of the cage firmly and fixedly together.

In its preferred form of embodiment, my invention is shown as applied to a cage for an annular ball bearing in which the balls are mounted in holding sockets formed by recesses in the adjacent faces of two complementary rings or sections provided in their outer edges at points between the balls with open slots, which rings are inclosed within the sections of the casing and fastened together by clamping or fastening devices extending through the parts of the casing and into the slots in the cage sections, and engaging with the casing in such manner as to firmly and securely hold the sections of the same together. It is manifest, however, that the invention in its broader aspects is susceptible of other forms of embodiment, and is not limited to any particular form or construction of the parts except in so far as such limitations are set forth in the claims.

In the accompanying drawings: Figure 1 is a plan view of the inner face of one of the complementary sections of the cage and the inclosing casing section, embodying my invention and showing the balls seated therein. Fig. 2 is a sectional elevation of the complete cage, the section being taken on a line extending diametrically across the center of the same. Fig. 3 is a plan view of a half portion of the same. Figs. 4 to 7 are each plan and sectional views respectively, showing different forms of the fastening devices for securing the parts of the casing together.

Referring to Figs. 1, 2 and 3, my improved cage comprises as its essential features, in one form of embodiment, two complementary ring-like sections 1 and 2, recessed in their adjacent faces to constitute ball holding sockets, a sheath or casing 3 embracing and inclosing the sections of the cage, and a series of fastening devices 4 applied to the casing and serving to clamp the same in the parts of the inclosed cage.

The recesses in the cage sections are so spaced that the balls A seated in the sockets formed thereby, will be disposed in very close arrangement, their surfaces being just out of contact with each other, so that the maximum number or the full complement of balls may be employed. At intervals in their outer edges, corresponding in position to the intervals between the balls, the sections of the cage are formed with open slots 5, 5ª, etc., extending axially thereof, as shown in Figs. 1 and 2, the purpose of which will presently appear.

The casing 3 is preferably in two complementary sections 3ª and 3ᵇ, U-shape in cross section, so as each to fit over and embrace one of the sections of the cage, these casing sections constituting conjointly an inclosing sheath or casing for the cage, as shown more particularly in Fig. 3, the said casing sections being formed with openings in their meeting edges to permit the balls to protrude therethrough, and being further formed in their outer faces near their outer edges with circumferential grooves $3^c$ and $3^d$ respectively.

The fastening devices 4 in the example shown in Figs. 1, 2 and 3, consist each of a wire staple of U-form, the two parallel limbs of which are passed through openings formed at intervals in the casing sections corresponding to the position of the open slots in the cage sections, the ends of said limbs being bent inwardly toward each other as at $4^b$ and seated in the circumferential groove in one of the casing sections, while the head of the staple is seated in the circumferential groove of the other casing section. With the fastening devices thus applied at intervals throughout the circumference of the cage, the parts of the casing will be firmly fastened together, and by reason of the extended contact of the casing with the cage sections inclosed therein, the latter will be held firmly and fixedly together and without liability of accidental separation. The exposed portions of the fastening devices being seated in the grooves in the casing sections, the cage will be free from projecting parts and there will be no liability of the ends of the staples being bent outwardly accidentally when the cage is in use.

In Fig. 4 the construction is the same as that just described, except that in securing the clamping devices, after being placed in position, the projecting ends of the same are bent outwardly in opposite directions from each other, as at $4^c$.

In the construction shown in Fig. 5, the fastening devices are, as in the first instance described, in the form of U-shaped staples, but with the addition of arms $4^d$ on the ends of the limbs, which arms are extended inwardly toward the inner edge of the cage and seated in radial grooves $3^e$ formed in one of the casing sections, the ends of the arms being bent down around the inner edge of the casing, as at $4^e$, to secure the staples in place.

In Fig. 6 the construction is the same as in Fig. 5, except that the ends of the arms $4^d$ are extended through the side of one of the casing sections and into the cage, as at $4^f$.

In Fig. 7, the circumferential grooves in the casing sections are omitted, and the fastening devices consist each of a single limb or body portion $4^g$, extending through the two parts of the casing and seated in the open slots in the cage sections, the ends of the limbs being provided with inwardly extending arms $4^h$ seated in radial grooves $3^t$ in the casing sections, and having their extremities extending inwardly through the side of the casing sections and into the cage sections.

Having thus described my invention, what I claim is:

1. A cage for antifriction bearings comprising two annular sections recessed in their adjacent faces to constitute holding sockets for the rolling elements, and provided in their external edges with open alining slots, a two-part casing applied to the cage sections and provided with external grooves, and fastening staples having their body portions extending axially through the casing sections and engaging in the slots in the cage sections, with the leg portions of said staples embedded in the grooves in the casing sections, said fastening staples serving to bind the parts together in an axial direction on the balls, and acting to prevent the relative circumferential displacement of the cage sections and casing sections.

2. A cage for antifriction bearings comprising two annular sections recessed in their adjacent faces to constitute holding sockets for the rolling elements, and provided in their external edges with open alining slots, a two-part casing applied to the cage sections and provided with external circumferential grooves, and fastening staples having their body portions extending axially through the casing sections and engaging in the slots in the cage, with the leg portions of said staples embedded in the circumferential grooves in the casing sections, said fastening staples serving to bind the parts together in an axial direction on the balls, and to prevent the relative displacement of the cage sections and casing sections.

In testimony whereof I affix my signature in presence of two witnesses.

MAX GOHLKE.

Witnesses:
 HENRY HASPER,
 WOLDEMAR HAUPT.